Sept. 30, 1958 P. J. H. JANSSEN 2,854,508

CIRCUIT ARRANGEMENT FOR USE IN TELEVISION RECEIVERS
FOR SEPARATING INTERFERENCE SIGNALS

Filed June 20, 1955 2 Sheets-Sheet 1

INVENTORS
PETER JOHANNES HUBERTUS JANSSEN
WOUTER SMEULERS

BY Fred M. Vogel
AGENT

CIRCUIT ARRANGEMENT FOR USE IN TELEVISION RECEIVERS FOR SEPARATING INTERFERENCE SIGNALS

Filed June 20, 1955 2 Sheets-Sheet 2

INVENTORS
PETER JOHANNES HUBERTUS JANSSEN
WOUTER SMEULERS
BY Fred M. Vogel
AGENT 2,854,508
Patented Sept. 30, 1958

2,854,508

CIRCUIT ARRANGEMENT FOR USE IN TELEVISION RECEIVERS FOR SEPARATING INTERFERENCE SIGNALS

Peter Johannes Hubertus Janssen and Wouter Smeulers, Eindhoven, Netherlands, assignors, by mesne assignments, to North American Philips Company, Inc., New York, N. Y., a corporation of Delaware Application June 20, 1955, Serial No. 516,502

Claims priority, application Netherlands June 29, 1954

11 Claims. (Cl. 178—7.5)

The invention relates to a circuit arrangement for use in a television receiver for separating interference signals. It is known that strong interference signals in the reception of positively modulated television signals produce white points on the reproducing screen of the receiver, which points may frequently be very troublesome. With the reception of negatively modulated television signals the interference signals give rise to the occurrence of dark points in the reproduced image, which is, in general, not troublesome. However, this modulation method has another limitation in that the interference signals affect adversely the synchronisation of the deflection means of the receiver. With the synchronisation of the line deflection means the use of automatic frequency control ("fly-wheel synchronisation") is capable of strongly reducing this disadvantage, but with the synchronisation of the frame deflection means the use of automatic frequency control cannot give satisfactory results. Consequently, in this case, mostly a direct synchronisation is carried out and spark interferences and the like are then liable to have a very troublesome effect.

Both in the receivers for positive modulation and for negative modulation many arrangements have been designed in an attempt to separate the interference signal from the incoming signal.

With positive modulation the control-signal for the reproducing tube, this signal still comprising the interference signal, is combined with the separated interference signal in a manner such that in practice a compensation of the interferences is obtained ("black spotter"). With negative modulation the synchronisation signal comprising the interference signal is combined with the separated interference signal in a manner such that also compensation of the interferences is obtained in practice ("noise inverter"). It will be obvious that the results of the aforesaid measures vary greatly with the extent to which the separated interference signal obtained corresponds to the real interference signal. With the circuit arrangements hitherto known, this correspondence leaves much to be desired, at least too much for obtaining a satisfactory result. With negative modulation, for example, it is known to separate out the interference signal by amplitude selection, those signal amplitudes which exceed the amplitudes of the peaks of the synchronizing pulses, being selected. This amplitude selection requires a fairly complicated arrangement and is, moreover, not efficient, since there are also interference signals, of which the amplitude is smaller than that of the peaks of the synchronizing pulses, but larger than the amplitude of the black level. On the one hand with the amplitude selection no information is obtained about this interference, but on the other hand the interference occurs within the amplitude range of the synchronizing pulses, so that it disturbs the synchronisation.

The circuit arrangement according to the invention has for its object to provide an improvement in the separation of interference signals and has the feature that the receiver comprises selecting means which pass a frequency band lying substantially within a complete image sideband of the television signal to be reproduced, the maximum response of the selecting means being at least three times that of the response for the image carrier wave and for the first 20 harmonics of the synchronizing pulses.

The arrangement according to the invention is based on the following recognition. Those interferences which have the aforesaid troublesome effect either with positive or with negative modulation, comprise, in general, a large number of components, of which the frequencies are distributed in a wide range, which, in general, is very much wider than the pass range of the television receiver. In general the Fourrier components of an interference signal lying within the pass range of the television receiver will differ little in amplitude. On the other hand it is known that the largest part of the image information in the television band extends from the image carrier to a frequency which differs therefrom by 0.5 to 1 mc./s. In the further part of the image sideband, i. e. from 0.5 to 1 mc./s. to the maximum sideband frequency the amplitudes of the image signals are only small.

In the event of an interference the interference information will largely exceed the image information in the last-mentioned frequency band. At the output of the selecting means, which select the frequency band concerned, those frequency components of the interferences occur, which fall within the selected band. It is true that in the receiver an interference is due to a larger number of components, i. e. also of those which fall within the non-selected part of the sideband, but this means only that the separated interference signal will have a slightly less steep course than the interference signal really occurring, since the separated interference signal is obtained from selecting means having a smaller bandwidth.

With negative modulation the separated interference signal is, as stated above, combined with the synchronizing signal in a manner such that the separated interference signal is in phase opposition to the interference occurring in the synchronizing signal. Provisions must then be made that the separated interference signal does not contain any substantial information about the synchronizing signal since such an information would be combined in phase opposition to the synchronizing signals, so that the final synchronizing signals would be distorted. The band selected by the selecting means must therefore not reach that part of the image sideband which comprises the fundamental frequency of the synchronizing signals and their most important higher harmonics. The repetition frequency of the line synchronizing pulses is about 10,000 to 20,000 C./S. in the various television systems, whilst the duration of these pulses is about 1/10 of the period. If the first 20 harmonics are not passed or are passed with strong attenuation through the selecting means, substantially no information about the synchronizing signals will occur at the output of the selecting means.

It is yet possible that some information about the image signals occurs at the output of the selecting means. However, in the case of negative modulation this is not troublesome, since the separated signal is joined to the synchronizing signal in phase opposition in order to obtain only the synchronizing signals and to suppress all interferences or other phenomena occurring among the synchronizing pulses. The image information which may be comprised in the separated interference signal does not, however, occur during the synchronizing pulses, since then no image information is transmitted. Therefore the finally obtained synchronizing signal is not disturbed by any image components liable to occur in the separated interference signal.

With positive modulation the separated interference signal is combined with the image signal in a manner such that the separated interference signal is in phase opposition to the interferences of the image signal. Provisions must then be made that the separated interference signal does not comprise any substantial image information, since otherwise this would be joined to the desired image information in phase opposition. The image information is concentrated in a television sideband around the image carrier and the harmonics of the line frequency and in general, i. e. in the most frequent images, the amplitude of the image signal rapidly decreases with an increasing sideband frequency.

In the selected band only image components thus occur which have a comparatively small amplitude as compared with the amplitude in the band of the interference components. Moreover, these are the image components which have a higher frequency. The complete detected signal obtained across the selecting means may be employed as a compensation signal, so that in the finally reproduced image the image components of higher frequency fail. However, with the detection of the output voltage of the selecting means a delay voltage will preferably be used such that in the detected signal the image components fail substantially.

The invention will be described more fully with reference to the drawing, in which.

Figure 1:
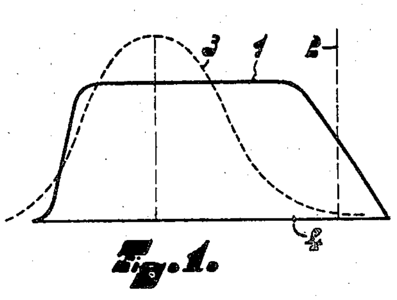
Fig. 1 shows a diagrammatical survey of the image sidebands of a television channel and of a band selected by the selecting means

Referring to Fig. 1, the full curve 1 designates the transmission characteristic curve for the intermediate-frequency part of the television receiver, in which 2 designates the intermediate-frequency image carrier. The bandwidth of the complete image sideband may be in this case be for example about 5 mc./s. The broken curve 3 designates the pass characteristic of the selecting means. The response may for example be at a maximum at a frequency which differs by 3 mc./s. from the frequency of the intermediate-frequency image carrier. From this maximum the response to frequencies nearer the image carrier frequency decreases in a manner such that the response for the image carrier and the first 40 harmonics of the synchronizing pulses is at least ten times smaller than the maximum response. The frequency of the 40th harmonic of the synchronizing pulses lies in the intermediate frequency range, for example approximately at point 4 of Fig. 1.

It should be noted that it is not necessary for the shape of the pass characteristic of the selecting means to be substantially equal to that of the curve 3, provided that the response is sufficiently small on the right-hand side of point 4. It is important to point out in this respect that the selected band will comprise less information about the synchronizing pulses and the lower image components accordingly as the response becomes relatively smaller for the lower sideband frequencies. In the embodiment shown the response is not reduced to one third of the maximum response in a range comprising the carrier wave and the first 20 harmonics of the synchronizing pulses, but to one tenth of the maximum response, i. e. for a band comprising the 40th harmonic of the synchronizing pulses. The severer are the requirements for the selecting means, the less correction is required for image or synchronizing components falling within the selected band.

Figure 2:
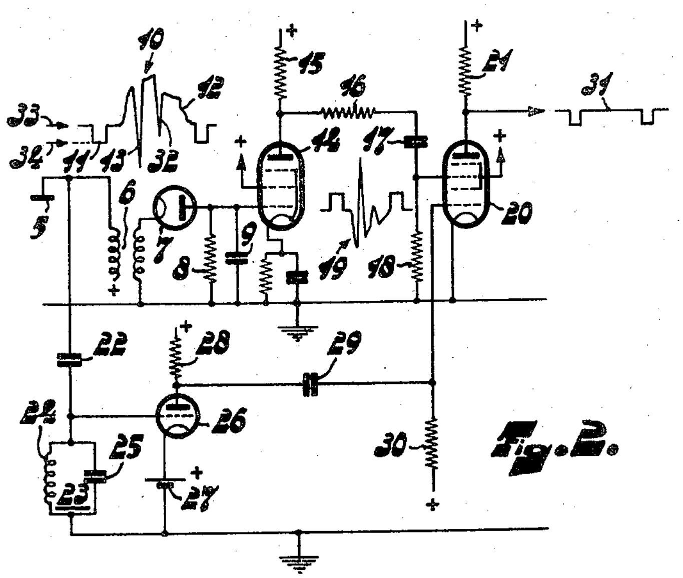
Fig. 2 shows one embodiment of the circuit arrangement according to the invention used in a receiver for negative modulation and Fig. 3 shows one embodiment of the circuit arrangement according to the invention used in a receiver for positive modulation.

Referring to Fig. 2, reference numeral 5 designates the anode of the last intermediate-frequency amplifying tube of a rceiver for negative modulation. The figure shows only the parts of the receiver necessary for a good understanding of the invention. The parts not shown may be all of known kind. The anode 5 is connected through a transformer 6 to the cathode of the detector diode 7. In the anode circuit of the diode 7 is produced across the parallel combination of the resistor 8 and the capacitor 9 the video signal of the waveform indicated at 10, with negative-going synchronizing pulses 11, positive-going image signal 12 and negative-going interference pulses 13 and 32. This signal is applied to the control-grid of the tube 14 and from the anode resistor 15 is obtained, via the resistor 16, the capacitor 17 and the resistor 18, the signal of the waveform indicated at 19, occurring across the resistor 18. This signal 19 is applied to the second control-grid of the multi-grid tube 20, constructed as a hexode. If the first control-grid of the tube 20 is at cathode potential, peak detection will occur in known manner at the second control-grid of the tube 20.

If the incoming signal 19 does not include interference pulses, the peaks of the synchronizing pulses will assume a level which is slightly positive relative to the cathode.

If an interference pulse occurs, a grid current pulse will, it is true, occur at the second control-grid, but this pulse is small since the grid-current characteristic curve of the second control-grid, after having exceeded a given value, has a substantially flat course. Therefore, the voltage across the capacitor 17 varies only little, so that no synchronizing pulses fail in the output circuit of the tube 20.

However, the interference pulses would still occur in this output circuit, for example across the anode resistor 21. It should be noted that the circuit arrangement described above has been suggested before. It has furthermore been suggested before to apply to the first control-grid of the tube 20 a voltage which cuts off the tube in the event of an interference pulse. According to one embodiment of the invention the anode 5, of the last intermediate-frequency tube is connected through a capacitor 22 to the circuit 23, comprising the parallel combination of a coil 24 and a capacitor 25. The response of this circuit 23 corresponds to the curve 3 of Fig. 1. The voltage occurring across the circuit is supplied to the control-grid of a triode 26, coupled as an anode detector. To this end, the cathode circuit includes a bias voltage source 27, by which in known manner an adjustment to a point of the lower part of the anode current grid voltage characteristic of the triode is obtained. Across the anode resistor 28 then occurs the detected and amplified interference with negative-going interference pulses.

This interference signal is supplied through a capacitor 29 and a leak resistor 30 to the first control-grid of the tube 20. In the event of an interference pulse 13 the tube 20 is cut off, so that in the output signal 31 no interference pulses prevail. In order to prevent any image signals and synchronizing signals liable to occur across the circuit 23 from exerting an influence on the first control-grid of the tube 20, the first control-grid may be connected through the leak resistor 30 to a positive delay voltage.

It should be noted that the advantage of the arrangement according to the invention resides in that the tube 20 can be cut off when an interference pulse such as the signal 10 at 32 occurs. This interference pulse has a peak lying between the black level 33 and the level 34 of the peaks of the synchronizing pulses 11. Consequently, this interference cannot be separated out by amplitude selection, as is possible with the interference pulse 13. However, the interference 32 contributes within the pass range 3 of the circuit 23, so that across the circuit 23 a pulse occurs which corresponds substantially to the interference.

Figure 3:
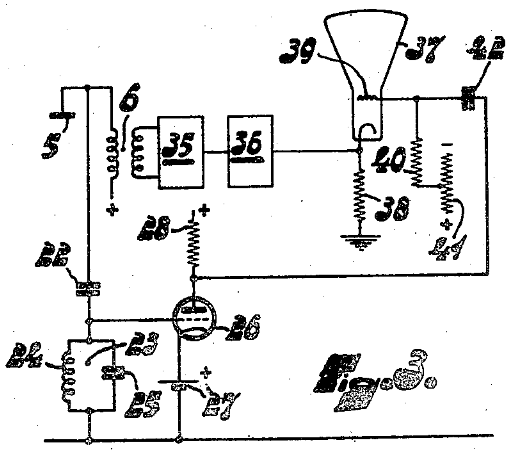

In Fig. 3, which shows a receiver for positive modulation, parts corresponding to the parts of the arrangement shown in Fig. 2 are designated by the same reference numerals. The image signal, which is in this case modulated in a positive sense on the intermediate-frequency image carrier, is supplied through the transformer 6 to the detector 35. Behind this detector 35 is connected a video amplifier 36. The output signal of the amplifier 36 is fed to the cathode of the reproducing tube 37 through the cathode resistor 38. Across this cathode resistor 38 occurs the signal with positive-going synchronizing pulses and negative-going image components and interference pulses.

At the occurrence of an interference pulse the potential of the cathode is thus reduced relatively to the potential of the control-grid 39 of the reproducing tube. The control-grid 39 is connected through the resistor 40 to an adjustable tapping of a potentiometer 41, which is connected to a suitable voltage source.

From the anode resistor 28 of the anode detector 26 is again obtained the separated interference signal with negative-going interference pulses. These interference pulses are fed through the capacitor 42 to the control-grid 39.

In the event of an interference pulse not only the potential of the cathode of the reproducing tube, but also the potential of the control-grid is reduced, so that the influence of the interference pulse is reduced substantially to zero. It should be noted that with the use of such a bias voltage from the source 27 as is normal for anode detection, image components of high frequencies will be at the same time detected, which thus also prevail at the control-grid 39 and thus compensate the corresponding image components occurring across the cathode resistor 38. The bias voltage from the source 27 is therefore preferably chosen to be so high that the working point of the triode 26 is shifted slightly beyond cut-off of the characteristic, so that the image components of small amplitude, occurring across the circuit 23 are not detected by the triode 26. Although the arrangements described above yield satisfactory results, with respect to the separation of the interference signals, there may be a certain disadvantage. The output circuit of the intermediate-frequency stage concerned has to fulfill definite requirements with respect to the frequency characteristic curve in accordance with the amplification of the intermediate-frequency television signal. If the selecting means are connected through a capacitor in the manner described above to the output circuit of the intermediate-frequency amplifying stage, a reduction of the amplification of this stage may occur at a particular frequency for the intermediate-frequency television signal. The frequency at which this drop occurs, is that at which series resonance of the coupling capacitor and the inductor of the circuit of the selecting means occurs.

In a further embodiment of the invention the selecting means comprise a bandpass filter, which is connected in series with a resistor in parallel with an inductor included in an output circuit of an intermediate-frequency amplifying stage of the intermediate-frequency circuit.

Owing to the use of a resistor as a coupling element the frequency characteristic curve of the intermediate-frequency stage is practically not affected by the coupling of the selecting means.

According to a further feature of the arrangement according to the invention the bandpass filter selects a band, of which the frequencies differ by less than 4 mc./s. and more than 2 mc./s. from the correct intermediate frequency of the image carrier.

The term "correct intermediate frequency of the image carrier" is to be understood to mean that frequency which coincides with the center of the Nijquist flank 44 (see Fig. 4) of the transmission characteristic curve of the receiver. If, in the generally used superheterodyne receiver, the frequency of the local oscillator has the correct value, also the intermediate frequency of the image carrier will have the correct value. With the aforesaid choice of the position of the pass range of the selecting means, even if the frequency of the local oscillator differs by 1 mc./s. from the correct value, on the one hand the selected band will always lie within the complete image sideband and on the other hand it will always differ by at least 1 mc./s. from the image carrier frequency then occurring. The latter is particularly of importance, since as stated above important frequency components of the synchronizing signal or of the image signal must be prevented from falling within the pass range of the selecting means.

It has also been stated above that the interfering effect of the image components and synchronizing components which are allowed to pass through the selecting means can be avoided to a great extent by using a delay voltage for the detector with the detection of the output voltage of the selecting means, so that in the detected signal the image signals fail substantially altogether. In a television receiver for negatively modulated television signals other methods may be carried out as was shown in Figure 2. Use is then made of a tube comprising two control-electrodes; to one control-electrode is applied the detected video signal with positively-going synchronizing pulses. To the second control-electrode is applied the detected interference signal with negative-going interference pulses. Then this second control-electrode may be connected through a resistor to a point of positive voltage.

However, if the amplitude of the intermediate-frequency television signal varies, for example owing to the use of contrast control in the receiver in a manner such that the intermediate-frequency amplitude is affected, it is advisable to vary the aforesaid bias voltages substantially in accordance with the amplitude of the intermediate-frequency television signal.

Figure 4:
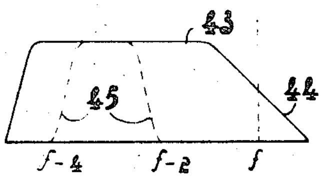
Fig. 4 shows a second diagrammatical survey of the transmission characteristic curve of the intermediate-frequency part of the television receiver and of the band selected by the selecting means, used in the circuit arrangement shown in Fig. 5

In Fig. 4 the full curve 43 designates the transmission characteristic curve of the intermediate-frequency part of a television receiver. The correct position of the intermediate-frequency image carrier with a frequency of $f$ mc./s. coincides with the center of the so-called Nijquist flank 44 of the characteristic curve 43. The pass range of the selecting means is indicated by the broken curve 45. This range extends from a frequency $f-2$ mc./s. to a frequency of $f-4$ mc./s. If the frequency of the local oscillator of the receiver differs for example 1 mc./s. from the correct frequency, so that the intermediate-frequency image carrier of Fig. 4 is shifted in place over 1 mc./s. to the left, there is always a frequency difference of 1 mc./s. between the image carrier and the frequency $f-2$ mc./s., so that no image component of high amplitude or important harmonics of the line synchronizing pulses lie within the pass range of the selecting means. If, on the other hand, the intermediate-frequency television signal of Fig. 4 shifts over a distance of 1 mc./s. to the right relative to the corret position, the pass range of the selecting means still falls just within the image sideband of the television signal.

Figure 5:
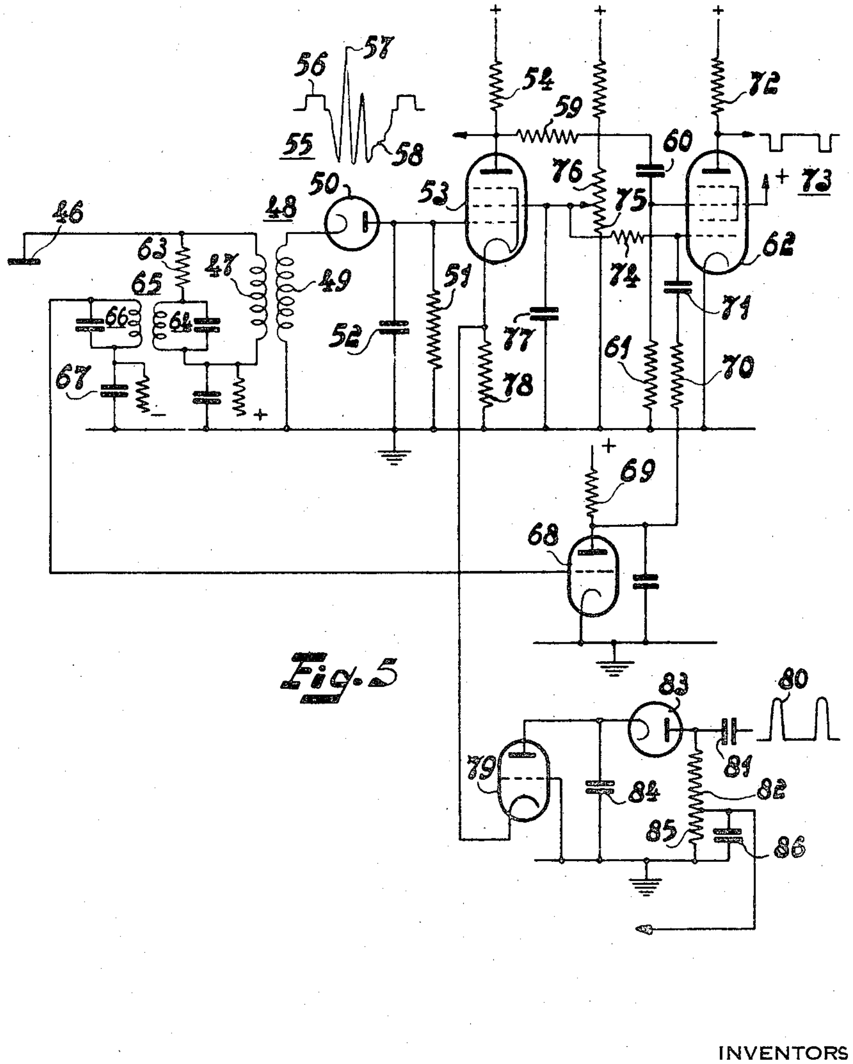
Fig. 5 shows a second embodiment of the circuit arrangement according to the invention used in a receiver for negative modulation.

Referring to Fig. 5 reference numeral 46 designates the anode of the last intermediate-frequency amplifying tube of a receiver for negative modulation. The anode circuit of this tube comprises the inductor 47, which constitutes at the same time the primary winding of the transformer 48, of which the secondary winding 49 is coupled with the cathode of the detector diode 50. In the anode circuit of the diode 50 there is produced across the parallel combination of the resistor 51 and the capacitor 52 the video signal with negative-going synchronizing pulses and positive-going image signal. This signal is applied to the control-grid of the tube 53. Across the anode resistor 54 of this tube occures the signal indicated at 55 with positive-going synchronizing pules 56, positive-going interference pulses 57 and negative-going image signals 58. This signal is supplied in known manner (not shown) to the cathode circuit of a cathode-ray tube. This signal is also supplied with the aid of the resistor 59, the capacitor 60 and the resistor 61 to the second control-grid of the hexode 62.

In parallel with the inductor 47 in the anode circuit of the last intermediate-frequency amplifier provision is made of the series combination of the resistor 63 and the input circuit 64 of the bandpass filter 65, of which the output circuit is designated by 66. This bandpass filter has the pass range 45 of Fig. 4. The oscillations occurring across the output circuit 66 are supplied in series with the negative bias voltage occurring across a capacitor 67 to the control-grid of a triode 68, connected as an anode detector. Across the anode resistor 69 of the triode 68 occurs the detected and amplified interference signal with negative-going interference pulses. This interference signal is supplied through the series combination of the resistor 70 and the capacitor 71 to the first control-grid of the hexode 62. At the occurrence of interference signals the anode current of the hexode is cut off, so that across the anode resistor 72 substantially no interference pulses occur and the synchronizing signal indicated at 73 can be derived from this resistor. In order to prevent any image signals and synchronizing signals occurring across the output circuit 66 of the bandpass filter 65 from acting upon the first control-grid of the tube 62, this control-grid is connected through the resistor 74 to a positive voltage.

The voltage is derived from the variable part 75 of a potentiometer 76. With the resistor 75 is connected in parallel the capacitor 77. The same variable voltage serves as a screen-grid voltage for the tube 53. With the aid of this variable screen-grid voltage the contrast of the video signal is controlled in a manner suggested before. This contrast control is carried out in co-operation with an automatic gain control of the receiver. To this end the cathode lead of the tube 53 includes the cathode resistor 78. The video signal occurring across this resistor is supplied to the cathode of a triode 79, of which the control-grid is connected to earth. The anode voltage of this triode 79 is obtained by rectification of the pulses 80 occurring during the fly-back of the line deflection circuit of the receiver. The production of these pulses is known per se and of no importance for a good understanding of the present invention.

These pulses are fed through a capacitor 81 to the resistor 82. The pulses occurring across the resistor 82 are rectified with the aid of the rectifier 83, a direct voltage being thus produced across the capacitor 84, connected between the anode of the triode 79 and earth. A capacitor 86 is connected in parallel with a part 85 of resistor 82. From this parallel combination 85, 86 is obtained the control-voltage for automatic gain control, which is supplied in known manner to the high-frequency and intermediate-frequency stages of the receiver.

Across the resistor 78 occur the synchronizing pulses in a negative sense. These pulses thus reduce the potential of the cathode of the triode 79. If this potential drops sufficiently, the triode 79 becomes conductive. Thus the charge of the capacitor 84 is reduced. This charge is restored at the occurrence of the next-following pulse 80, so that the direct voltage across the parallel combination 85, 86 becomes more negative. The arrangement is adjusted in a manner such that the peaks of the synchronizing signals at the control-grid of the tube 53 substantially coincide with the cut off of the anode-current, grid-voltage characteristic curve of the tube 53.

If the screen-grid voltage of the tube 53 is increased, this cut-off shifts to a further negative value. If the amplitude of the signal at the control-grid of the tube 53 would not vary, the voltage across the cathode resistor 78 would be higher than before at the occurrence of the synchronizing pulses. Thus the current passing the triode 79 would decrease and the voltage across the parallel combination 85, 86 would become less negative. Thus the high-frequency and intermediate-frequency amplification of the receiver is increased, to an extent such that even with the new screen-grid voltage of the tube 53 the peaks of the synchronizing pulses again lie at the cut-off of the tube characteristic curve. An increase in screen-grid voltage thus provides a contrast control and and increase in amplitude of the intermediate-frequency signal.

If image components and synchronizing components penetrate into the bandpass filter 66, also the amplitude of these penetrating components will increase at an increase in the amplitude of the intermediate-frequency signal. In order to reduce their influence subsequent to detection, the delay voltage at the first control-electrode of the tube 62 must, consequently, also be increased. This is obtained in this case, since from the screen-grid voltage also is derived the delay voltage for this first control-electrode via the resistor 74.

It should be noted that also the negative bias voltage for the control electrode of the anode detector 68 may be varied in proportion to the amplitude of the intermediate-frequency television signal. This may also be carried out in a receiver for positively modulated television signals.

What is claimed is:

1. A television receiver circuit for reducing the effects of interference signals, comprising a source of television signals composed of an image sideband associated with an image carrier frequency and containing video signals and synchronizing pulses, first detector means for detecting said image sideband, a frequency-selective circuit connected to receive said image sideband and having a frequency bandpass characteristic curve having a maximum amplitude region which is narrower than the frequency bandwidth of said image sideband, said frequency-selective circuit being tuned so that the amplitude of said bandpass characteristic curve is no greater than one third of said maximum amplitude at the frequency range comprising said carrier frequency and the first twenty harmonics of said synchronizing pulses, second detector means for detecting the signals passed by said frequency-selective circuit, and means for combining in opposite phase the detected signals produced by said first and second detector means.

2. A circuit as claimed in claim 1, in which said source of television signals comprises an intermediate-frequency amplifier, and in which said frequency-selective circuit comprises a parallel-tuned circuit coupled to the output of said intermediate-frequency amplifier.

3. A circuit as claimed in claim 2, including a capacitor connected between an end of said parallel-tuned circuit and the output of said intermediate-frequency amplifier.

4. A circuit as claimed in claim 1, in which said source of television signals comprises an intermediate-frequency amplifier having an output inductor, and in which said frequency-selective circuit comprises a band-pass filter, and including a resistor connected in series combination with said band-pass filter, said series combination being connected in parallel with said output inductor.

5. A circuit as claimed in claim 4, in which said band-pass filter has a bandpass frequency range which is no closer than two megacycles to said image carrier frequency and which extends no more than four megacycles away from said image carrier frequency.

6. A television receiver circuit for reducing the effects of interference signals, comprising a source of television signals composed of an image sideband associated with an image carrier frequency and containing video signals and synchronizing pulses, first detector means for detecting said image sideband, a frequency-selective circuit connected to receive said image sideband and having a frequency bandpass characteristic curve having a maximum amplitude region which is narrower than the frequency bandwidth of said image sideband, said frequency-selective circuit being tuned so that the amplitude of said bandpass characteristic curve is no greater than one third of said maximum amplitude at the frequency range comprising said carrier frequency and the first twenty harmonics of said synchronizing pulses, second detector means for detecting the signals passed by said frequency-selective circuit, an electron tube having two control electrodes and an output electrode, means for feeding the detected output signal from said first detector means to one of said control electrodes with a polarity which renders said tube relatively more conductive, means for feeding the detected output signal from said second detector means to the other of said control electrodes with a polarity which renders said tube relatively less conductive, and means connected to said output electrode to derive said synchronizing pulses therefrom.

7. A circuit as claimed in claim 6, including biasing means connected to said other control electrode and having a voltage value tending to cause said tube to be conductive.

8. A circuit as claimed in claim 7, including means connected to cause said biasing voltage to vary substantially proportionately to the amplitude of said image sideband.

9. A television receiver circuit for reducing the effects of interference signals, comprising a source of television signals composed of an image sideband associated with an image carrier frequency and containing video signals and synchronizing pulses, first detector means for detecting said image sideband, a frequency-selective circuit connected to receive said image sideband and having a frequency bandpass characteristic curve having a maximum amplitude region which is narrower than the frequency bandwidth of said image sideband, said frequency-selective circuit being tuned so that the amplitude of said bandpass characteristic curve is no greater than one third of said maximum amplitude at the frequency range comprising said carrier frequency and the first twenty harmonics of said synchronizing pulses, second detector means for detecting the signals passed by said frequency-selective circuit, a picture reproducing tube having means for producing an electron beam and two control electrodes for controlling the intensity of said electron beam, and means respectively connected to feed the detected signals from said detector means to said two control electrodes, respectively, in a phase relationship whereby the interference signal components of said detected signals tend to control the intensity of said electron beam in opposite senses.

10. A circuit as claimed in claim 9, including biasing means connected to bias said second detector at a voltage value whereby the video and synchronizing components are substantially eliminated from the detected interference components.

11. A circuit as claimed in claim10, including means connected to cause said biasing voltage to vary substantially proportionately to the amplitude of said image sideband.

References Cited in the file of this patent

UNITED STATES PATENTS 2,151,145 Percival -------------- Mar. 21, 1939